United States Patent

Haenel

[11] 3,954,313
[45] May 4, 1976

[54] ANTI-FRICTION ROLL BEARINGS
[75] Inventor: Karl-Heinz Haenel, Niederwerrn, Germany
[73] Assignee: SKF Industrial Trading and Development Company, B.V., Amsterdam, Netherlands
[22] Filed: Sept. 30, 1974
[21] Appl. No.: 510,295

[30] Foreign Application Priority Data
Oct. 4, 1973 Germany............................ 2349942

[52] U.S. Cl................................ 308/216; 308/180; 308/202
[51] Int. Cl.² ........................................ F16C 33/58
[58] Field of Search .......... 308/180, 174, 175, 202, 308/207 R, 216

[56] References Cited
UNITED STATES PATENTS
2,195,794  4/1940  Weckstein .......................... 308/216
2,962,328  11/1960  Benktanjer.......................... 308/180

FOREIGN PATENTS OR APPLICATIONS
918,646  2/1963  United Kingdom................. 308/216

Primary Examiner—Robert R. Song
Assistant Examiner—Richard A. Bertsch
Attorney, Agent, or Firm—Murray Schaffer

[57] ABSTRACT

An anti-friction bearing having an inner race and an outer race and a plurality of rolling bodies arranged therebetween. A separate retaining ring or axial border rim is arranged adjacent the rolling bodies and in contact with one of the race rings. The contact race ring and the retaining border rim are provided with corresponding radial holes and are secured together by rivets through at least some of the holes.

5 Claims, 1 Drawing Figure

U.S. Patent  May 4, 1976  3,954,313
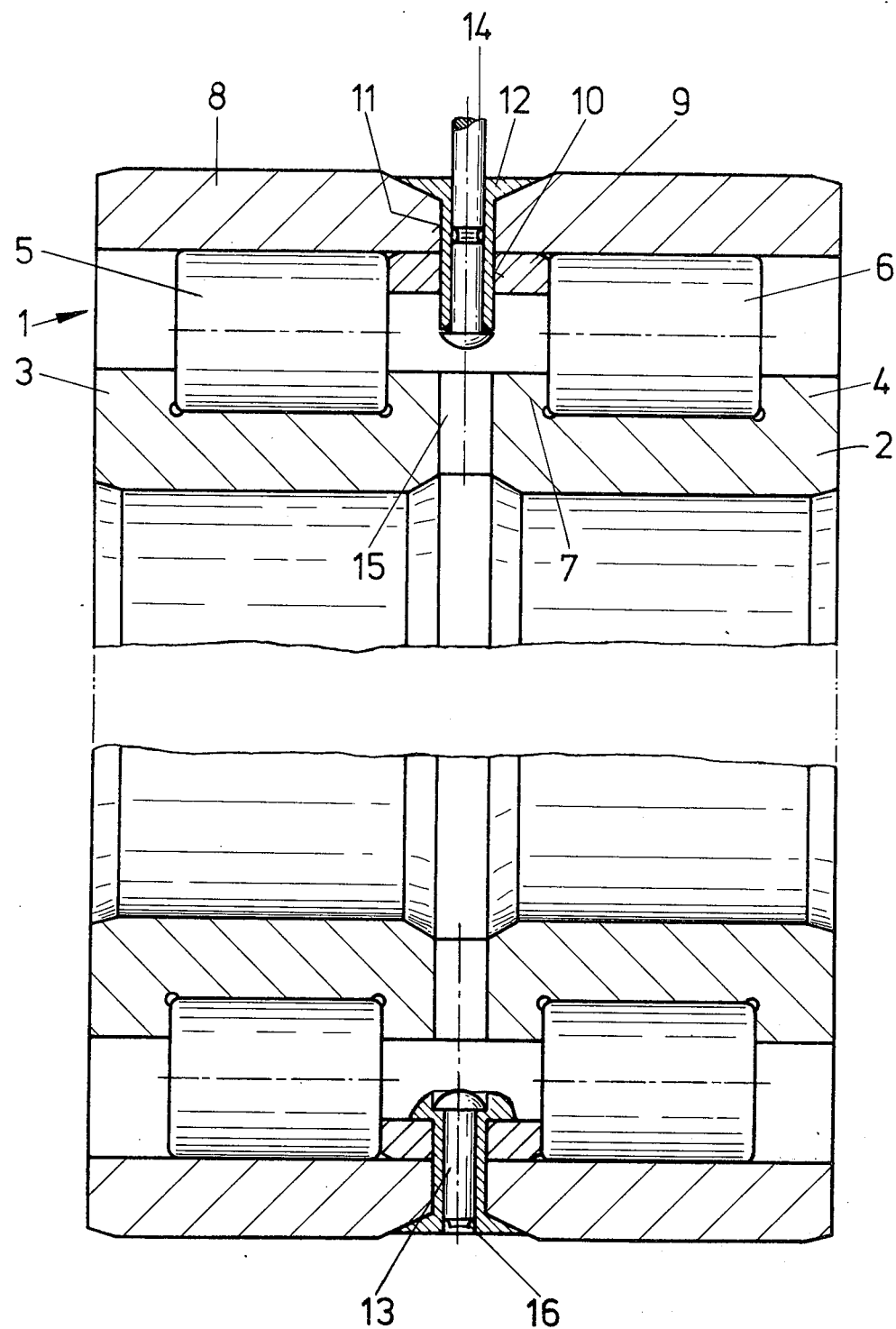

ANTI-FRICTION ROLL BEARINGS

BACKGROUND OF THE INVENTION

The present invention relates to anti-friction bearings and in particular to an anti-friction bearing having multiple rows of rolling bodies wherein a race ring is provided with at least one separate and additionally provided retaining edge or axial border rim.

Anti-friction bearings having retaining edges or border rims additional to the race rings are known per se. As a rule the additional retaining edge of border rim is formed loose, i.e., separate from the race, to allow the bearing races and the rolling bodies to be easily assembled. The retaining edges or border rim is provided, where the demand exists to increase the supporting effect of the bearing or when the races accommodate a very large number of rolling bodies. Such rims or retaining edges are also used when in addition to radical loads, the bearing is intended to absorb or transmit axial forces. In general, the loose retaining edge or border rim is secured only on installation of the bearing about a shaft or in the supporting housing by fixing the retaining edge or rim on an axial support. This means that during the transport and pre-installation of the bearing the separable parts are not secured together and may easily fall apart.

It has been known to secure the loose retaining edge or border rim to the appropriate race ring, after the installation of the roll body by gluing, welding or by making the retaining edge or border rim as a split resilient ring capable of snapping in and engaging within an annular groove formed on the bearing ring. It has also been known to attach the loose retaining edge or border rim to the race by means of screws, bolts, rivets or the like which are set within axial bores formed on the side or frontal faces of the bearing race ring.

In the case of multiple row bearings retaining edges and border rims have been provided between adjacent rows of rolling bodies. These interposed retaining edges or border rims create great design and use difficulties because they cannot be fixed with axial precision between the rows during installation. In bearings employing multiple rows of cylindrical rolling bodies it is now conventional to employ separate races for each of the adjacent rows of rolling bodies. These separate races are held together after installation and assembly of the bearing, by special means such as a sheath drawn over the combined outer surfaces of the races or by providing the races with rings on their outer surfaces which rings engage in corresponding receiving grooves in an outer shell. The employment of separate races not only calls for additional operation in the assembly of the bearing but moreover requires special complex and expensive means for holding the separate parts of the race together prior to installation.

It is an object of the present invention to provide an anti-friction bearing of the type described which overcomes the disabilities and disadvantages of the known prior art.

It is an object of the present invention to provide an anti-friction bearing having a separate retaining edge or border rim which is simple and easily assembled even under the most difficult design conditions.

It is a further object of the present invention to provide an anti-friction bearing having a separate retaining edge or border rim capable of being easily assembled with its associated race member between adjacent rows of rolling bodies with axial precision. It is a further object of the present invention to provide an anti-friction bearing having separate retaining edges or border rims which may be easily and simply assembled to the associated race ring adjacent the frontal edges of the race ring.

The foregoing objects, other objects, together with numerous advantages of the present invention will be apparent from the following disclosure of the preferred embodiments thereof.

SUMMARY OF THE INVENTION

According to the present invention the foregoing objects is obtained by providing a loose retaining edge or border rim adapted to engage the inner or outer surface of the corresponding bearing ring. The retaining edge or border rim and the corresponding bearing ring are provided with several correspondingly arranged radial holes distributed circumferentially over their periphery in which are inserted rivets which secure the retaining edge or border rim and associated race ring together.

Preferably the rivets are blind rivets which are inserted from the exterior or interior surface of the associated race ring through the holes and which are then mechanically upset and riveted by appropriate means from the exterior of the bearing. By these means it is thus possible to attach the loose and separable retaining edge or border rim, after assembly of the bearing, even at less accessible points of the bearing, for instance between adjacent rows of rolling bodies.

Full details of the present invention are set forth in the following description of an embodiment thereof and are illustrated in the accompanying drawing.

BRIEF DESCRIPTION OF THE DRAWING

The FIGURE of the drawing is a radial sectional view through a doubled row anti-friction bearing.

DESCRIPTION OF THE INVENTION

In the following description the present invention is illustrated as being applied to an anti-friction bearing having cylindrical rolling bodies set in two parallel rows and wherein the retaining edge or border rim provides the spacer between the adjacent rows. It will be obvious from the foregoing description that the separate retaining edge or border rim may be just as easily secured to its associated race ring at either or both of the frontal edges of the bearing, in addition to being utilized as the spacer between the adjacent rows.

As seen in the FIGURE the two row cylinder roller bearing is intended primarily as a radial bearing. However, it is suitable for absorbing and transmitting axial forces as well. The bearing, generally depicted by the numeral 1 comprises an inner race ring 2 having a pair of integrally formed side rims 3 and 4 and an intermediate rim 7 between which two rows 5 and 6 of cylindrical roll bodies are held. The roll bodies are not held or guided in a cage but sit within the annular groove seats formed by the parallel rims 3, 7 and 4. An outer race ring 8 having a substantially cylindrical inner race surface is provided. The outer race ring is designed mainly as a sheath covering the outer surfaces of the rolling bodies. Between the two parallel rows 5 and 6 of the rolling bodies there is arranged a flanged retaining rim 9 which is initially formed separate from the races. The outer diameter of the retaining rim 9 conforms substantially to the inner diameter of the outer race 8 and engages with its surface. The retaining rim 9 is formed with several radially directed holes or bores 10 distributed circumferentially over its outer periphery. The outer race ring is likewise provided with several radial holes or bores 11 correspondingly spaced about its periphery to the holes 10 formed in the retaining rim 9. Rivets 12 are inserted through at least some of the corresponding holes 11 and 10 and are deformed in conventional manner so as to securely hold the retaining rim 9 to the interior surface of the outer race ring 8.

Preferably the rivets 12 are in the form of blind rivets which are riveted to the surface of the outer race ring 8. In the upper half of the drawing, a blind rivet is represented before it is upset or riveted while in the lower half of the FIGURE the blind rivet is seen after being riveted. Clinching or riveting can take place after the assembly of the individual parts of the bearing and the retaining rim 9 can be easily inserted between the rows 5 and 6 of the rolling bodies before the sheath-like outer race ring 8 is applied thereto. By the use of the rivets 12 the flanged retaining rim 9 is fixed axially at a precise location between the two rows 5 and 6 and is thus capable of transmitting axial forces to each of the roll bodies in each row.

For the sake of better understanding the ease and simplicity of the present invention the process of blind riveting will now be briefly described as it is applied thereto. The blind rivet 12, cylindrical in shape and having an enlarged head, is placed over the shank 13 of a riveting mandril 14 which is then affixed to the riveting or pulling tool. The blind rivet and the mandril 14 are inserted through the corresponding holes 10 and 11 and thereafter the mandril 14 is withdrawn axially by means of the suitable riveting tool. Through the outward withdrawal movement of the mandril 14 the material of the rivet 12 is upset at its end and is compressed so as to securely join the retaining rim 9 and the race ring 8. At the same time the deformation of the hollow rivet body 12 takes place inside the holes 10 and 11 as well as over the surface of the retaining rim 9. The cylindrical portion of the rivet shank is forced over the surface and side of the holes and at the same time is given considerable radial extension as seen in the lower portion of the FIGURE. In the last phase of the formation of the rivet the mandril 14 is broken away from the stem 13 and is withdrawn by the riveting tool. The stem 14 may thereafter be removed from within the bearing through radial holes 15 formed in the inner race ring. On removal of the stem 13 of the riveting tool, the rivet 12 is left with a through bore 16 which can be used as an inlet or outlet for the supply or discharge of bearing lubricant to the interior of the bearing. On the other hand, solid blind rivets may also be used. The embodiment described herein shows the attachment of the separate retaining edge at the most inaccessible point of a bearing. The method and construction is however not confined to the example shown since it will be obvious that the same can be used to attach separate retaining rings or border edges on the outer side edges of the bearing. Moreover, the present invention is not restricted to the use of cylindrical roll bodies but may be employed to secure the retaining edges and border rims of other types of bearings as well. Accordingly, it is intended that the present disclosure be taken as illustrative of the invention and not as limiting in its scope.

What is claimed is:

1. An anti-friction bearing comprising an inner and outer race ring and a plurality of rolling bodies arranged therebetween, a separate retaining edge member adapted to engage the surface of one of said race rings adjacent said rolling bodies, said retaining edge member and said engag race ring being formed with correspondingly arranged radial holes formed about their circumference and rivets extending through at least some of said holes said rivets having a head at each end securing said retaining edge and engaged race ring together.

2. An anti-friction bearing comprising an inner race ring, an outer race ring and a plurality of rolling bodies arranged therein in at least two annular axially spaced rows, an annular spacer arranged in contact with one of said rings between each of the adjacent rows, said one race ring and spacer having a plurality of radial holes correspondingly formed about their circumference, riveting means extending through at least some of said holes securing said spacer to said one ring, said other race ring being provided with at least one radial hole and said rivet is a hollow blind rivet inserted by a tool having a compression mandril, said compression mandril being removable through the hole in said other race ring.

3. The bearing according to claim 2 wherein said one ring is provided with a cylindrical interior race surface.

4. The bearing according to claim 3 wherein said one ring is the outer race ring.

5. The bearing according to claim 3 wherein said other race ring is provided with annular border edges for axially retaining said rolling bodies.

* * * * *